Sept. 11, 1951 — M. SORENSEN — 2,567,497
EDUCATIONAL GAME DEVICE
Filed June 5, 1947 — 3 Sheets-Sheet 1

Inventor:
Madeline Sorensen,
By C. C. Hines,
Attorney.

Sept. 11, 1951     M. SORENSEN     2,567,497
EDUCATIONAL GAME DEVICE
Filed June 5, 1947     3 Sheets-Sheet 2
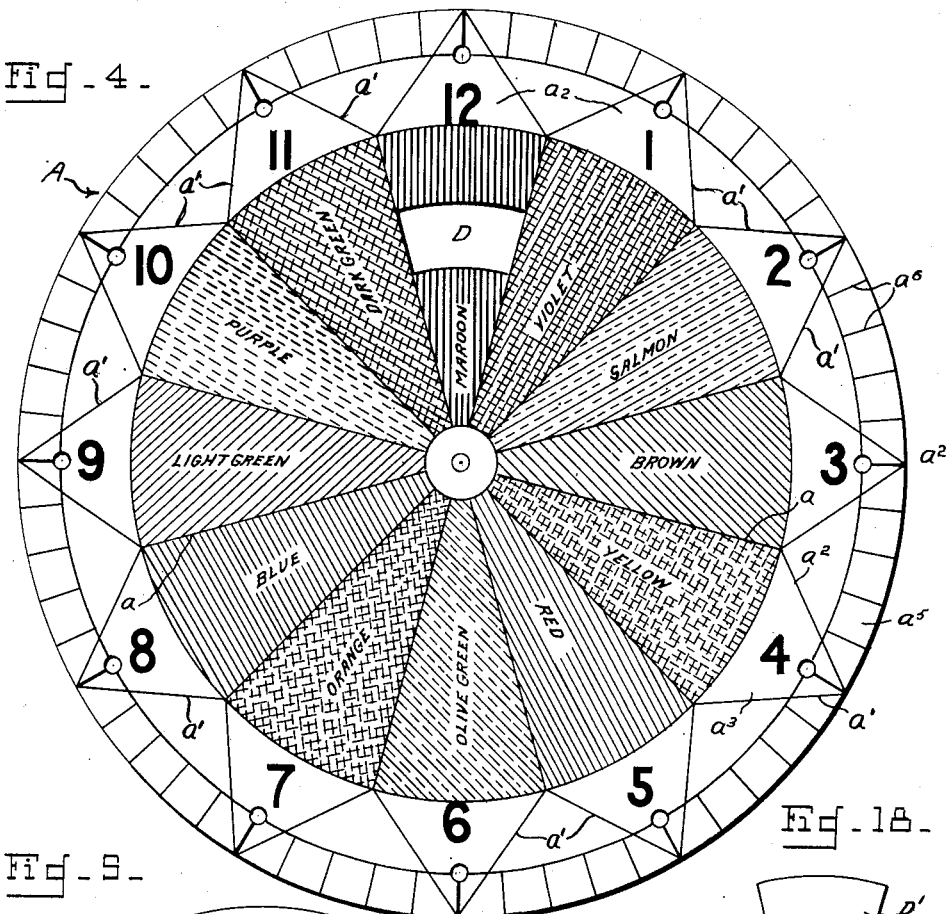
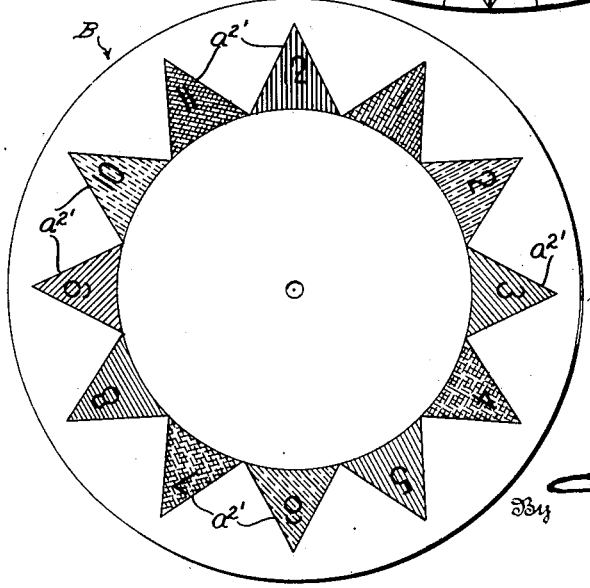
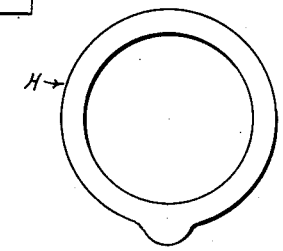
Inventor:
Madeline Sorensen,
Attorney.

Sept. 11, 1951      M. SORENSEN      2,567,497
EDUCATIONAL GAME DEVICE
Filed June 5, 1947      3 Sheets-Sheet 3
Fig-6-      Fig-7-      Fig-8-
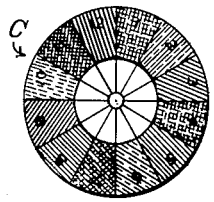 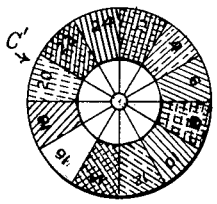 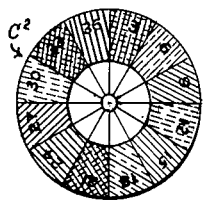
Fig-9-      Fig-10-      Fig-11-
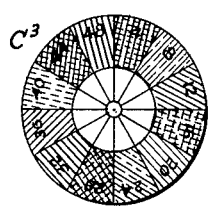 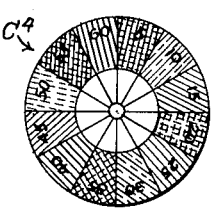 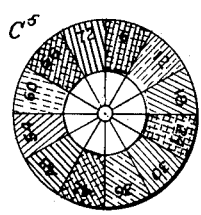
Fig-12-      Fig-13      Fig-14-
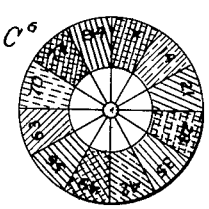 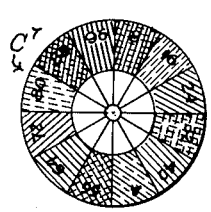 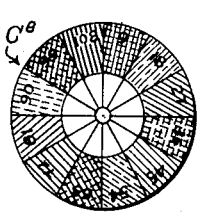
Fig-15-      Fig-16-      Fig-17-
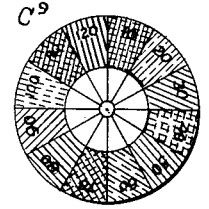 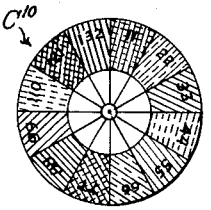 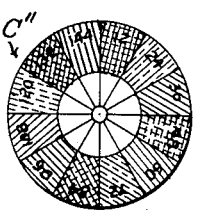
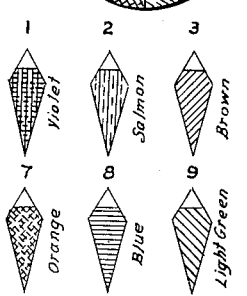
Fig-20-
Inventor:
Madeline Sorensen,
By C. C. Hines,
Attorney.

Patented Sept. 11, 1951

2,567,497

UNITED STATES PATENT OFFICE 2,567,497

EDUCATIONAL GAME DEVICE

Madeline Sorensen, Inglewood, Calif.

Application June 5, 1947, Serial No. 752,630

8 Claims. (Cl. 35—31)

This invention relates to an educational and exercising game device which I call Arithma-Peg, designed for use in playing games affording amusement, interest and physical exercise, as well as mental diversion and instruction, and which, while intended principally for the use of children, will also be of interest and amusement to adults in playing various games.

One object of the invention is to provide a game device which, in addition to its other features and uses, is of assistance in instructing children how to read the time indicators of a time piece in order to tell time.

Another object of the invention is to provide a game device involving the use of pins or pegs and rings in playing educational games giving physical exercise as well as instruction.

Still another object of the invention is to provide a game device whereby mathematical games may be played to teach the players multiplication, addition and subtraction.

Still another object of the invention is to provide a game device which is made attractive by the use of colors, and which teaches the players how to distinguish colors, at least the principal colors, and makes use of color features in playing games, thus adding zest and interest in the playing of games.

Still another object of the invention is to provide a device which takes advantage of child psychology in instructing children to readily distinguish colors and to do simple mathematics through the force of repetition and in the guise of playing games instead of doing study work of a kind disliked by many children.

Still another object of the invention is to provide a game device which may be used as an ordinary card table when desired.

In the accompanying drawings illustrating my invention:

Figure 4 is a view similar to Figure 1 with the indicating hands and number disks removed.

Figure 5 is a top plan or face view of the selector disk.

Figure 1:
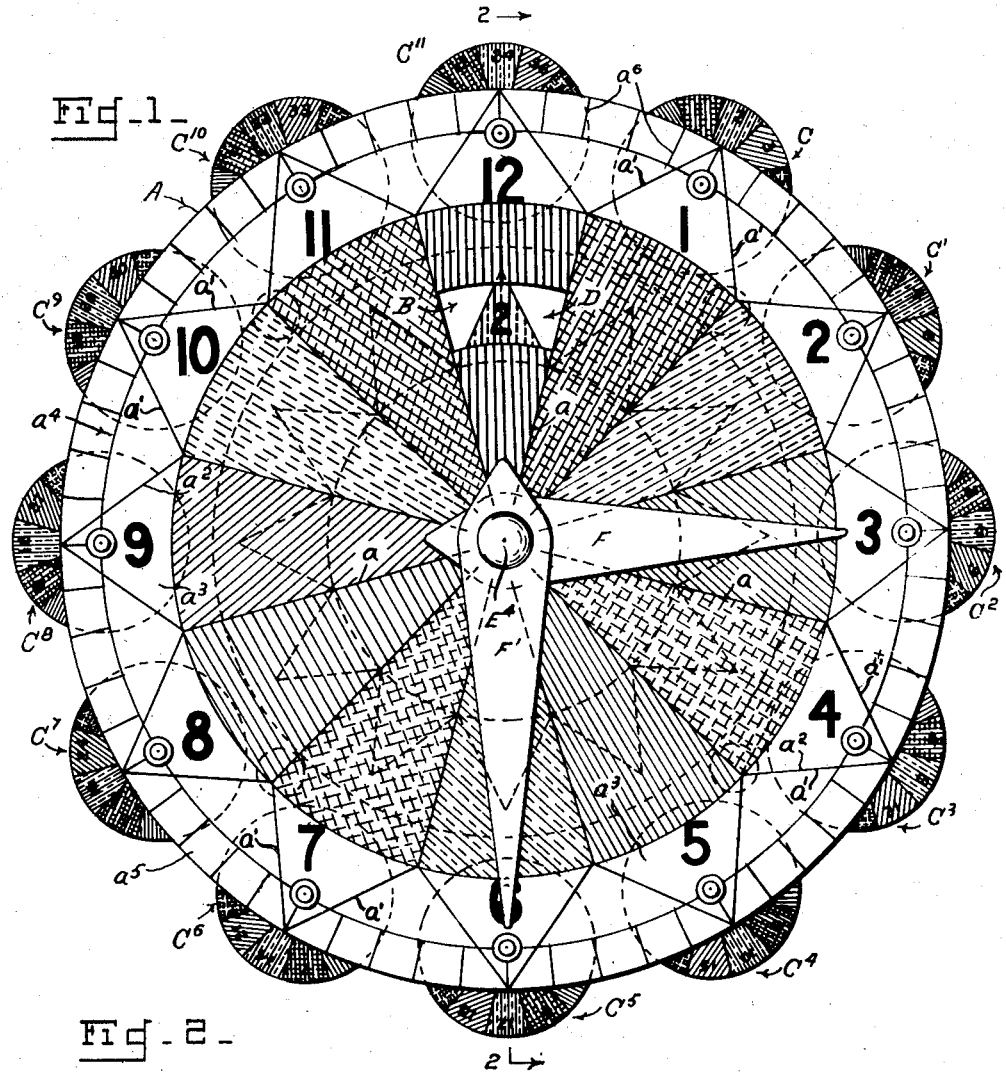
Figure 1 is a top plan or face view of the game device.
Figure 2:
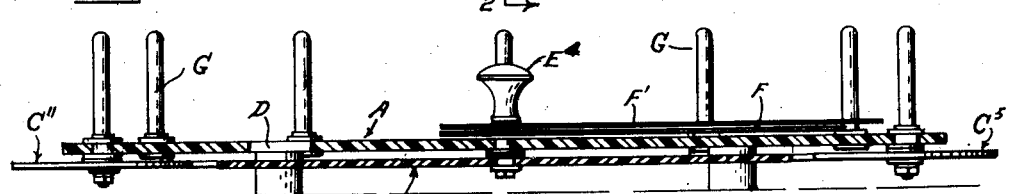
Figure 2 is a section through the same taken, for example, on line 2—2 of Figure 1.
Figure 3:
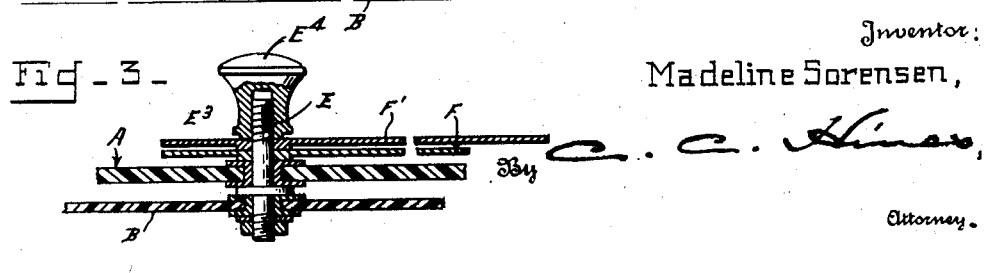
Figure 3 is an enlarged detail section similar to Figure 2, taken through the central portions of the main and selector disks of the device, their pivotal connection and the indicator hands.

Figures 6 to 17, inclusive, are similar views of the number disks.

Figure 18 is a view of the slot closure member.

Figure 19 is a view of one of the quoits or rings used in playing the games.

Figure 20 is a diagrammatic view illustrating the color scheme of the radial spaces of the dial.

In carrying my invention into practice, I provide a game device comprising in general a main or top board, dial or disk A, a bottom selector disk B and a plurality of number of calculator disks C, $C^1$, $C^2$, $C^3$, $C^4$, $C^5$, $C^6$, $C^7$, $C^8$, $C^9$, $C^{10}$ and $C^{11}$, in conjunction with which are employed quoits or casting rings H, as hereinafter described. The disks A, B and C are of circular form and of the different diameters shown and may be made of cardboard, Celluloid or of any of the well known synthetic plastics in commercial use. Each disk is of sufficient thickness and stiffness to render it proof in ordinary use against bending, buckling, curling or otherwise getting out of shape.

The face of the larger disk A has an appearance somewhat similar to that of a clock dial. This face is divided by radial lines $a$ and the outwardly converging lines $a^1$ to provide segmental spaces numbered 1 to 12, inclusive, extending from its center toward its rim and terminating in triangular pointers $a^2$ extending to its rim edge and forming triangular spaces $a^3$ between adjacent pointers. Concentric with the rim edge of the disk A is a circular line $a^4$ forming with said rim edge a circular space $a^5$. The spaces 1 to 12 and the portions of their pointers $a^2$ lying inside the line $a^4$ represent for time instruction purposes hour spaces, and are differently colored for the purpose of, first, imparting a pleasing and ornamental appearance to the disk, second, of giving to the young instruction respecting principal colors of the color scales, and, third, to make use of contrasting colors as point indicators in the playing of different games. The spaces $a^3$, $a^5$ may be of a different color from any of the spaces 1 to 12, inclusive—for example, white, and the space $a^3$ is divided by equally spaced lines $a^6$ in line with and between the tips of the pointers $a^2$, to denote minute lines or other fractions of an hour or other time period. In the present instance there are sixty of these division or indicating lines $a^6$ representing the number of minutes in an hour of time. Although any set of colors may be used, it is to be assumed, for example, that the dial spaces 1 to 12, inclusive, are respectively colored violet, salmon, brown, yellow, red, olive green, orange, dark blue, light green, purple, dark green and maroon. The tips of the pointers $a^2$ are arranged to indicate, for time instruction purposes, the hour points disposed like the dial of a conventional clock. One of the colored spaces, as the space 12, has a cutaway portion providing an observation slot or opening D, through which a selected portion of the disk B may be displayed. This opening D may be closed when desired by fitting therein a closure plate $D^1$ of the corresponding form shown in Figure 18.

The bottom disk B is a selector disk which is smaller in diameter than the disk A, but which is provided with triangular spaces or pointers $a^{2'}$ colored similar to and bearing the same numbers as the colored spaces and pointers of disk A. The pointers $a^{2'}$ on disk B, however, are arranged so that, by rotation of the disk B, any one of the pointers of disk B may be brought to view at the opening D. In practice, therefore, only the pointers on disk B need be contrastingly colored and the use of segmental spaces on this disk like those on disk A may be dispensed with.

The dial B is fixed to a center spindle or screw E which passes upwardly through an opening or tubular bearing $E^1$ at the center of the dial and has fitted thereon a nut $E^3$ forming an operating knob whereby the dial B may be rotated to bring any of its numbered pointers into view at the opening D for number and color selection purposes, as hereinafter described. On the screw are frictionally fitted hour and minute hands, F, $F^1$, preferably made of plastic material, which may be turned to indicating positions independently of the disk B for cooperation with the hour numbers on dial A and the lines $a^6$ to indicate periods of time. The use of these hands makes it possible for young children to be instructed in telling the time when observing the face of a clock or other timepiece.

The number disks C to $C^{11}$, inclusive, are mounted at the hour points of the dial A on spindles G whereby they may be manually rotated. Each of these disks is provided with twelve colored spaces, colored according to the spaces 1 to 12 of the dial, but with the exception of disk C differently numbered from the dial spaces and disk $C^1$ and from each other. As shown in Figures 6 to 17, inclusive, the spaces of disk C are numbered from 1 to 12, inclusive, but the numbers on disks $C^1$—$C^{11}$ are multiples of their starting numbers. Thus the starting number of disk $C^1$ is 2 and the remaining numbers are multiples of 2 from 4 to 24, and so on throughout the series, disk $C^{11}$ having the starting number 12 and multiples of the same from 24 to 144. The starting numbers on the disks C—$C^{11}$ accord with the hour or indicator numbers of the colored spaces of dial A and indicate their positions relative to the dial space numbers, in line with which the disks C—$C^{11}$ are placed about the periphery of dial A. Each disk C—$C^{11}$ is fixed to its spindle G so that it may be turned to bring its numbers successively or to bring any of its numbers in indicating position with relation to the associated pointer $a^2$ for score indications. The spindles G are comparatively slender and project upwardly to form pegs on which quoits or rings H, of the type shown in Figure 19, may be cast by the players in playing the games. In practice each player may have a certain number of casts or throws and the number of rings H used may vary according to the game being played. The spindles may also be used to spin the disks C—$C^{11}$ to bring the different colors and numbers thereon into registry with the pointers $a^2$ to make counting points in playing certain games.

Before explaining the uses of the game device, it may be stated that the game device may be hung on a wall or supported on a table or floor for use, and that in playing games in which rings H are cast to "ring" the pegs G the casting point may be spaced a distance of say six feet more or less from the game device. If desired, the game device may be provided with folding legs attached to the bottom of dial A, which legs may be similar to those of a folding card table, so that the device itself may be of table structure. When so provided with legs the device may, when desired, be used as an ordinary card table by simply detaching the indicator hands and fitting the closure plate $D^1$ in the slot D so that the face of the dial A will provide a continuously smooth playing surface. The device may also be used in like manner as a card table when supported on a floor or other suitable supporting surface. The device is not limited in use to an indoor game device, but may be made on a large scale for outdoor use. In practice the rings H are or may be made of rubber and of a suitable size and weight for effective use.

Various games may be played by the use of this game device, some of which may be explained as follows:

*The game of learning to tell time.*—This game of learning to tell time is fun for small children, who readily learn the numbers from 1 to 12, and each one has his or her turn to operate the clockwork (hands) by turning the hands first to the hours and later to the half hours and, in course of game lessons, to the minutes, whereby in a short period of lessons children of even tender age can understand the positions of the hands so that they can tell the time by reference to the dial and hands of a clock or other timepiece. Many children reach the seventh and eighth grades without learning to tell time, but by the use of this game device children may be taught at home and in the kindergarten to tell time with short instruction. The work as well as the brightly colored dial makes this interesting to them and it has been found that each child eagerly awaits his turn.

*Simple game of quoits.*—A simple game of quoits or ringers may be played by casting the rings H over the different pegs G to secure game counts, the player making the greatest number of ringers and counts in a certain number of throws winning the game. Other obvious ways of playing this kind of game may be employed.

*Spinning games.*—Simple spinning games may be played by spinning the disks C—$C^{11}$ by means of their spindles to bring the numbers thereon into registry with the pointers $a^2$ to indicate score counts, the player making the greatest number of counts in a certain number of spins winning the game. In playing ring casting games the disk B may be successively rotated to bring each colored and numbered portion thereof into display position at the display opening D and the player may be required to cast a ring onto the spindle of a small disk C—$C^{11}$ arranged opposite the number on disk A corresponding to the selected number on disk B. If he fails to do so on one or more casts he may be penalized to the extent of the sum of the numbers displayed by disk B, the similar number on disk A and the number on the small disk which the player has failed to ring, added together or multiplied in any agreed upon manner. If he should succeed in casting a ring onto the proper spindle he may in like manner credit to himself the sum of the numbers as scoring points. If he should have two casts on each play on the spindles of successive small disks, he may be penalized in the manner stated with respect to the unsuccessful cast and granted scores with respect to the successful cast. In the event, however, that he should be successful in making both casts, he may be given the privilege, as a reward, to turn one or both of the ringed small disks to bring into register with the associated pointer or pointers $a^2$ of disk A the colored portion or portions of such small disks corresponding to the displayed colored portion of disk B and to add to his score the number or numbers on the small disks appearing on the registered colored portion or portions thereof. If, however, he should fail to turn the small disk or disks to display the proper color he may be penalized in any desired way because of his failure to know the color, the sum of the penalty being subtracted from the amount of the reward score. On the other hand, his success in turning the small disk or disks to the proper color will indicate that he knows the color and, if required, he may be called to name it.

In playing spinning games, the disk B may be turned on successive plays to bring its colored and numbered portions into view at the opening D, and each player in turn will spin the small disk arranged opposite the number on disk A corresponding to the displayed number on disk B, with the object of bringing into register with the pointer $a^2$ associated with such number on disk B the colored portion on the small disk corresponding to the displayed color of disk B. If he succeeds he may credit to himself as a score the sum of the amounts on the disks A, B, C—$C^{11}$ pertaining to this particular play, calculated by addition or multiplication. If he should fail, he may be penalized to the extent of this sum or any part of it. If he should be allowed as a try two or more spins and fail on one and succeed on the other, he may be penalized as to one and granted scores on the other. If he should be successful in both or all attempts, if allowed more than two, he may be rewarded by allowing him to spin another and higher counting small disk, with the possibility of greatly increasing his score according to the number value of the selected color displayed on the higher counting small disk.

Many and various kinds of games by casting or spinning may be played in the manner described by varying the number of casts or spins allowed and also varying the manner of allowing scores and prescribing penalties. In playing these games, colors or numbers, or both, play a part, in addition to counting points involving addition, multiplication and subtraction, so that while playing interesting or amusing games the player is being instructed by force of repetition, of which he is not aware, because of his desire to win or his interest in playing the game. Whenever the disks B and C—$C^{11}$ are turned to display a color and a number the player may be asked to name the color and/or number, and in this way he quickly becomes familiar with the colors and numbers and also with the arithmetical tables up to certain amounts and how to add, subtract or multiply numbers within a certain range. This method of teaching by repetition, while playing, has been found of value in quickly teaching such subjects to even backward children in primary and elementary grades and even in teaching colors to those who do not easily acquire the knowledge of distinguishing colors.

It will be observed that the use of the disk B allows a teacher to display different colors and/or numbers and to ask the pupils to find the same colors and numbers on the disk A or by turning the disks C—$C^{11}$, which children like to do, and each time the disk B is turned to a different color-number, and each time a play is made in playing a game, the teacher may ask the pupil to name the colors and numbers, so that the pupil cannot fail to be instructed notwithstanding the fact that he may find it difcult to study or disinclined to be instructed in the usual way.

It will also be observed that while the colors on the disks C—$C^{11}$ are the same the numbers on the disks vary on the different disks, and that these numbers, in addition to being important in instructing pupils in arithmetic, have different scoring values in playing games according to the colors and numbers on the disk B displayed at the opening D. Thus disk B may be turned to display any one of the colors thereon, starting, for example, with salmon (No. 2) or any of the other numbered colors. The player may then have one or more chances to cast a ring over the spindle of disk $C^1$. If successful, he may turn this disk $C^1$ to bring the salmon color thereon into register with the adjacent pointer $a^2$ of disk A to score in a manner above described and to show that he knows the color and how to match it.

A game may also be played by setting the clock hands to register with certain selected colors on the disk A and having the player try to cast rings onto the spindles of the adjacent small disks. If successful, the player may turn the small disks to bring the colors thereon corresponding to the selected colored portions of disk A into registry with the associated pointers $a^2$, the numbers of the registering colored portions of the small disks being used as scoring counts. A similar game may be played by requiring the player to spin the small disks in attempts to bring the proper colors thereon into registry with the pointers $a^2$ associated with the selected colors. In either case successes and failures may be scored in any of the ways above described.

It is well known that many children learn to tell colors and how to match them more readily than they learn numbers and how to use them in doing simple addition, multiplication and subtraction, but that the reverse is sometimes the case. By the use of my device, however, in which colors and numbers on the several disks A, B, C—$C^{11}$ are interrelated in comparing colors and/or numbers or using them in defining and obtaining scoring points in play, a child quickly learns by repetition how to tell both colors and numbers, and how to employ the latter in doing examples, without conscious mental effort or loss of interest because of his wish to excel or his desire to play.

*The game of multiplication.*—Any reasonable number of players may play this game, the player making the greatest number of points on ringing all pegs around the dial being counted the winner. The scores may be placed on a score-board or pad at the end of each turn of a player and totaled at the end of the initial and each succeeding round of plays about the dial until the winning player makes the prescribed number of points. At the start all the disks C—$C^{11}$ should be set at normal or starting position, while the disk B is set to display a desired number-color symbol (any one of them desired) through the display opening B, this displayed symbol being the multiplier to be used. In playing this game, in which the players take regular turns and seek to ring the pegs G of dial spaces 1 to 12, inclusive, each player, who may be allowed six throws on each turn, is required to ring all pegs on each round and the required number of rounds are played until the winning player makes the prescribed score. In Figure 1 it will be seen that the selector disk is set to show symbol 2 (color salmon) at the opening B and that the disks C—C¹¹ are shown in their starting positions. Each player must ring all pegs 1 to 12, inclusive, in order to make a round. The players throw the rings H from a selected distance point, say six feet from the game device, and each player must at the beginning of his initial turn try to ring peg 1 and if he succeeds he tries to ring the succeeding pegs up to the limit of his turn of six throws. If he misses a peg he may elect to try again to ring the missed peg or he may proceed to try to ring succeeding pegs within the limits of his throws. Assuming that #1 player rings No. 1 peg, misses pegs Nos. 2, 3 and 5, but also rings pegs 4 and 6, disks C¹, C⁴ and C⁴, which are adjusted to indicating positions, as the rings are made, will show that his scores are 2×1=2, 2×4=8 and 2×6=12, or a total of 22, which total is posted on a scoreboard or pad. The other players then proceed to take their turns in the same manner. When #1 player again takes his turn he must try to ring in proper order the pegs he previously missed (pegs 2, 3 and 5), and, if he succeeds, but not before, he can then proceed to attempt to ring peg No. 7 and succeeding pegs within his limit of six throws, or he may be permitted to again make ringers on pegs Nos. 1, 4 and 6, if he so elects, to count double scores, namely, 4 points for No. 1, 16 points for No. 4, and 24 points for No. 6. Playing is conducted in this manner until one of the players rings all pegs, when his score is counted, and when other contestants in their turn finish their equal number of throws their scores are counted, the one having the highest number winning. It will be seen from the foregoing that the displayed selected color symbol number on dial B represents the multiplier, the color symbol numbers on dial A the multiplicands and the color symbol numbers on the disks C—C¹¹ the products, and that by the use of the selector symbols of disk B in proper turn a game of interesting and amusing character may be played, which enables the multiplication tables to be taught in a ready manner, and which affords sufficient exercise to give spastic children and those recovering from polio the aid they need for physical development and coordination of wasted muscles.

*The game of addition and substraction.*—In playing this game each player may be allowed to take two chances at ringing No. 1 peg. The player making the highest number may be given the privilege of starting as the first player and of setting the disk B to select an arbitrary peg he may desire to ring on his first throw, the others being limited as to first throw to peg No. 1. Each player is allowed six throws, and the score of each player is posted, according to the numbers of the pegs he rings, on a suitable scoreboard. These scores of the players are added until one of the players scores a winning number of points, which may be set at from 1,000 to 5,000 or more. Each failure of a player to ring a peg on making a toss may be counted against him, five points or more being substracted as a penalty for such failure. In this game the spindle E may be used as a master or king peg, and each player during his turn may be allowed to make one of his six throws at this king peg to give him a lucky score of 100 points, which allows high scores by good players to be quickly made.

*The game of fives.*—In playing this game the selector disk is set at 5 and the players cast rings on the pegs, including the king peg, and using the same method of playing the multiplication game, until one player scores a certain number of points, from 1,000 to 10,000 or more.

From the foregoing description, the construction and some of the many possible modes of use of my improved game device will be readily understood without a further and extended description. Its value and advantages are that it is a colorful device and attractive in appearance, and, in addition to giving instruction in colors, in telling time, and in arithmetic in an interesting and amusing manner, also affords mental diversion and physical exercise of benefit to children backward in arithmetic and in keeping small children usefully occupied and especially spastic children and those recovering from polio in aiding muscular development and coordination. While the construction of the device as disclosed is preferred, it will, of course, be understood that changes in the form, size, construction and arrangement of parts may be made, within the scope of the appended claims, without departing from the spirit or sacrificing any of the advantages of the invention.

Having thus described my invention, I claim:

1. An educational game device comprising a disk formed with a display opening and having a playing surface divided into differently colored portions grouped about a common center and extending toward its periphery and provided adjacent its periphery with an annular series of spaced numerals from 1 to 12, inclusive, disposed in line with said colored portions, a selector element rotatably mounted on the underside of the disk and provided with a corresponding series of colored and numbered portions and rotatable to bring any of its colored and numbered portions into indicating position at the display opening for comparison with the colored portions and computation with the numerals on the disk, and a series of smaller products carrying members equal in number to the numerals on the disk and rotatably mounted thereon adjacent to said numerals, each of said products carrying members having similarly arranged and colored portions to correspond with the colored portions of the disk and each bearing a set of twelve numerals varying in value from the numerals on the other products carrying members including a starting numeral corresponding with that of the adjacent numeral on the disk and other numerals representing products of said starting numeral when multiplied by a numeral on the selector element displayed at the display opening.

2. An educational game device comprising a main disk formed with a display opening and having a playing surface divided into differently colored portions grouped about a common center and extending toward its periphery and provided adjacent its periphery with an annular series of spaced numerals from 1 to 12, inclusive, disposed in line with said colored portions, a selector disk rotatably mounted on the underside of the main disk and provided with a corresponding series of colored and numbered portions and rotatable to bring any of its colored and numbered portions into indicating position at the display opening for comparison with the colored portions and computation with the numerals on the main disk, a series of smaller products disks equal in number to the numerals on the main disk, and spindles rotatably mounting the smaller disks on the main disk adjacent to said numerals on the main disk, each of said smaller disks having similarly arranged and colored portions to correspond with the colored portions of the main disk and each bearing a set of twelve numerals including a starting numeral corresponding with that of the adjacent numeral on the main disk and other numerals representing products of said numeral when multiplied by a numeral on the selector disk displayed at the display opening, said spindles having portions projecting upward from the face of the main disk and forming handles for rotating the smaller disks and serving as pegs on which rings may be cast in playing a game.

3. An educational game device comprising a main disk formed with a display opening and having a playing surface divided into differently colored portions grouped about a common center and extending toward its periphery and provided adjacent its periphery with an annular series of spaced numerals from 1 to 12, inclusive, disposed in line with said colored portions, a selector disk rotatably mounted on the underside of the main disk and provided with a corresponding series of colored numbered portions and rotatable to selectively bring any of its colored numbered portions into indicating position at the display opening for comparison with the colored portions or computation with the numerals on the main disk, and a series of smaller disks equal in number to the numerals on the main disk and rotatably mounted thereon adjacent to said numerals, each of said smaller disks having similarly arranged and colored portions to correspond with the colored portions of the main disk and each bearing a set of twelve numerals varying in value from the numerals on the other small disks and each arranged so as to be brought by rotation of the disk into registry with the adjacent numeral on the main disk for computation therewith and with the displayed numeral on the selector disk to enable by computation of the said displayed and registering numerals different mathematical results to be obtained.

4. An educational game device comprising a disk formed with a display opening and having a playing surface divided into differently colored display portions grouped about a common axis and each having a distinguishing value indicator associated therewith, a selector element provided with a corresponding number of display portions and value indicators associated therewith and rotatbly mounted on the disk to bring any of its display portions into indicating position at the display opening for comparison with the colored portions or computation with the value indicators of the disk, a series of small display elements equal in number to an arranged adjacent the display portions and value indicators of the disk and each provided with colored display portions corresponding to those of the disk and with value indicators associated with its display portions, each of said small display elements being rotatably mounted on the disk for color comparison with the colored portions of the disk or computation of its value indicators with the value indicators on the disk and with the displayed indicator on the selector element to enable by computation of the indicated values different aggregate results to be obtained serving as score points in playing a game.

5. An educational game device comprising a disk formed with a display opening and having a playing surface divided into differently colored display portions grouped about a common axis and each having a distinguishing value indicator associated therewith, a selector element provided with a corresponding number of display portions and value indicators and rotatably mounted on the disk to bring any of its display portions into indicating position at the display opening for comparison with the colored portions or cooperation with the value indicators of the disk, a series of small display elements equal in number to and arranged adjacent the display portions and value indicators of the disk and each provided with colored display portions corresponding to those of the disk and with value indicators associated with its display portions, each of said small display elements being rotatably mounted on the disk to bring any of its display portions into indicating position for color comparison with the colored portions of the disk or computation of its value indicators with the value indicators on the disk and with the displayed indicator on the selector element to enable by computation of the indicated values different aggregate results to be obtained as score points in playing a game, and spindles mounting said small display elements on the disk and projecting upwardly therefrom to form pegs on which rings may be cast in playing a game.

6. An educational game device comprising a main disk formed with a display opening and having a playing surface divided into differently colored spaces grouped about a common center and provided adjacent its periphery with an annular series of spaced numerals from 1 to 12, inclusive, disposed in line with spaces, a selector disk rotatably mounted on the underside of the main disk and provided with a corresponding series of colored portions and numerals and rotatable to bring any of its colored portions and associated numeral into indicating position at the display opening for value computations in connection with the numerals on the main disk, and a series of smaller products disks rotatably mounted on the main disk adjacent to the numerals thereon, each of said smaller disks having radial divisions equal in number to and colored to correspond with the colors of the main disk, including a starting numeral corresponding to the adjacent numeral on the main disk and other numerals which are multiples of the starting numeral.

7. A game device comprising a disk formed with a display opening and having a playing surface divided into differently colored display portions grouped about a common axis and each having a distinguishing numeral associated therewith, a selector element provided with a corresponding number of display portions and associated numerals and rotatably mounted on the disk to bring any of its colored display portions and its associated numeral into indicating position at the display opening for comparison with the colored portions of or counting calculation in connection with the numerals on the disk, and a series of small display elements equal in number to and arranged adjacent the display portions and numerals of the disk and each provided with colored display portions corresponding to those of the disk and with numerals associated with its display portions, including a starting numeral corresponding to that on the adjacent portion of the disk and representing the same color and including also a set of other numerals which are multiples of the starting numeral, each of said small display elements being rotatably mounted on the disk to bring any of its display portions into indicating position with respect to the similarly numbered display portion of the disk for color comparison with said colored portion of the disk or for counting calculation of its numerals in connection with the adjacent numeral on the disk or the displayed numeral on the selector element to enable various aggregate numbers to be calculated serving as score points in playing a game.

8. A game device comprising a disk formed with a display opening and having a playing surface divided into differently colored display portions grouped about a common axis and each having a distinguishing numeral associated therewith, a selector element provided with a corresponding number of display portions and associated numerals and rotatably mounted on the disk to bring any of its colored display portions and its associated numeral into indicating position at the display opening for comparison with the colored portions of or counting calculation in connection with the numerals on the disk, and a series of small display elements equal in number to and arranged adjacent the display portions and numerals of the disk and each provided with colored display portions corresponding to those of the disk and with numerals associated with its display portions, including starting numeral corresponding to that on the adjacent portion of the disk and representing the same color and including also a set of other numerals which are multiples of the starting numeral, each of said small display elements being rotatably mounted on the disk to bring any of its display portions into indicating position with respect to the similarly numbered display portion of the disk for color comparison with said colored portion of the disk or for counting calculation of its numerals in connection with the adjacent numeral on the disk or the displayed numeral on the selector element to enable various aggregate numbers to be calculated serving as score points in playing a game, and spindles mounting said small display elements on the disk and projecting upwardly therefrom to form handles whereby the small element may be rotated or pegs on which rings may be cast in playing a game.

MADELINE SORENSEN.

REFERENCES CITED

The following references are of record in the file of this patent:

UNITED STATES PATENTS

| Number | Name | Date |
| --- | --- | --- |
| 280,655 | Morris et al. | July 3, 1883 |
| 1,013,827 | Strauders | Jan. 2, 1912 |
| 1,024,195 | Gothberg | Apr. 23, 1912 |
| 1,670,159 | Maxon | May 15, 1928 |
| 1,682,151 | Soldane | Aug. 28, 1928 |
| 1,858,153 | Hammond | May 10, 1932 |
| 2,336,742 | Maguire | Dec. 14, 1943 |